United States Patent
Ghosh et al.

(10) Patent No.: US 11,700,306 B2
(45) Date of Patent: Jul. 11, 2023

(54) CONTEXT AWARE EDGE COMPUTING

(71) Applicant: International Business Machines Corporation, Armonk, NY (US)

(72) Inventors: Partho Ghosh, Kolkata (IN); Sarbajit K. Rakshit, Kolkata (IN); Venkata Vara Prasad Karri, Visakhapatnam (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/536,501

(22) Filed: Nov. 29, 2021

(65) Prior Publication Data
US 2023/0171313 A1    Jun. 1, 2023

(51) Int. Cl.
*H04L 67/12* (2022.01)
*G05B 19/418* (2006.01)
*G16Y 10/25* (2020.01)
*G16Y 30/00* (2020.01)
*H04L 67/52* (2022.01)

(52) U.S. Cl.
CPC .......... *H04L 67/12* (2013.01); *G05B 19/4185* (2013.01); *G16Y 10/25* (2020.01); *G16Y 30/00* (2020.01); *H04L 67/52* (2022.05)

(58) Field of Classification Search
CPC ......... H04L 67/12; H04L 67/52; G16Y 10/25; G16Y 30/00; G05B 19/4185
See application file for complete search history.

(56) References Cited

U.S. PATENT DOCUMENTS

| | | | |
|---|---|---|---|
| 2017/0060574 A1* | 3/2017 | Malladi | G06F 9/542 |
| 2019/0116128 A1* | 4/2019 | Guo | H04L 67/101 |
| 2019/0361917 A1* | 11/2019 | Tran | G06Q 20/3276 |
| 2020/0225655 A1* | 7/2020 | Cella | G06N 3/045 |

OTHER PUBLICATIONS

Chandramohan, et al., "A Self-Configurable Edge Computing for Industrial IoT." In International Journal of Engineering and Advanced Technology (IJEAT), vol. 9 Issue-2, Dec. 2019. 5 pages. DOI: 10.35940/ijeat.B3868.129219.

Dechouniotis, et al., "Edge Computing Resource Allocation for Dynamic Networks: The DRUID-NET Vision and Perspective " In Sensors 2020, 20, 2191; doi: 10.3390/s20082191, MDPI, Apr. 13, 2020, 18 pages.

(Continued)

*Primary Examiner* — Normin Abedin
(74) *Attorney, Agent, or Firm* — Jared L. Montanaro

(57) ABSTRACT

A processor may analyze a physical environment. One or more portions of the physical environment may have an edge computing resource requirement. The processor may determine, based on the analyzing, one or more additional edge computing resources to be placed in a surrounding area associated with the one or more portions of the physical environment. The processor may situate, automatically, the one or more additional edge computing resources on a material handling device in the surrounding area and that is directed toward the one or more portions of the physical environment.

20 Claims, 5 Drawing Sheets

(56) References Cited

OTHER PUBLICATIONS

Mahmud, et al., "Context-aware Placement of Industry 4.0 Applications in Fog Computing Environments." In IEEE Transactions on Industrial Informatics. Manuscript received Apr. 30, 2019; revised Oct. 15, 2019. http://www.adelnadjarantoosi.info/pdf/TII2019.pdf.

Mell, et al., "The NIST Definition of Cloud Computing," Recommendations of the National Institute of Standards and Technology, U.S. Department of Commerce, Special Publication 800-145, Sep. 2011, 7 pgs.

Parameswaran, et al., "Cognitive Intelligent Equipment Design in Context-Aware Cloud Robotics for Material Handling Using in Cognitive Industrial Internet of Things." In Pramana Research Journal, vol. 8, Issue 6, 2018. 15 pages. https://www.pramanaresearch.org/gallery/prj-p422.pdf.

Wan, et al., "Context-Aware Cloud Robotics for Material Handling in Cognitive Industrial Internet of Things." In IEEE Internet of Things Journal, Jul. 28, 2017, 10 pages. doi: 10.1109/JIOT.2017.2728722.

\* cited by examiner

CONTEXT AWARE EDGE COMPUTING

BACKGROUND

The present disclosure relates generally to the field of edge computing, and more specifically to dynamic placement of edge devices for context aware edge computing.

Edge computing is computing that takes place at or near a physical location of either a user or a source of data. By placing computing services closer to these locations, users can benefit from faster, more reliable services while additionally invoking the benefits from the flexibility of hybrid cloud computing. Edge computing is one technique that allows a common pool of resources to be used and distributed across a large number of locations.

SUMMARY

Embodiments of the present disclosure include a method, computer program product, and system for context aware edge computing. A processor may analyze a physical environment. One or more portions of the physical environment may have an edge computing resource requirement. The processor may determine, based on the analyzing, one or more additional edge computing resources to be placed in a surrounding area associated with the one or more portions of the physical environment. The processor may situate, automatically, the one or more additional edge computing resources on a material handling device in the surrounding area and that is directed toward the one or more portions of the physical environment.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
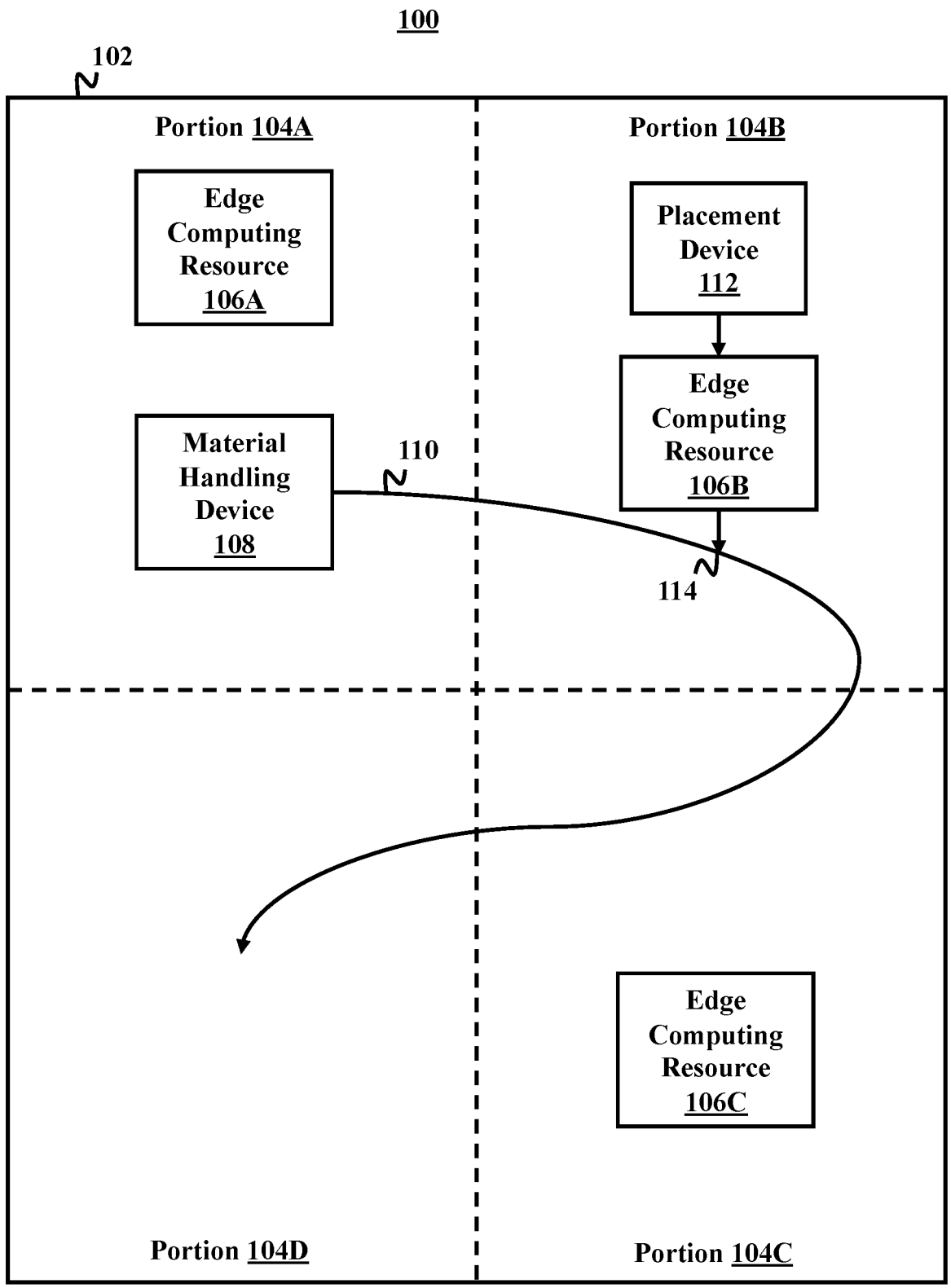
FIG. 1 illustrates a block diagram of an example system for dynamic placement of edge devices for context aware edge computing, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of edge computing, and more specifically to dynamic placement of edge devices for context aware edge computing. While the present disclosure is not necessarily limited to such applications, various aspects of the disclosure may be appreciated through a discussion of various examples using this context.

There is a recent trend of edge computing, which extends cloud computing and the Internet of Things (kJ) to the edge of a network. Edge computing moves more computational power and resources closer to end users by increasing the number of endpoints and locating them nearer to the consumers, be they users or devices. Fundamentally, edge computing architectures are built on existing technologies and established paradigms for distributed systems, which means that there are many well understood components available to create the most effective architectures to build and deliver edge use cases.

During edge computing there is a requirement for an appropriate number of far edge devices, and the said required number of far edge devices will collaborate with each other to perform edge computation.

In any industrial floor (e.g., physical environment), different types of material handling systems may be present. The material (e.g., boxes, hardware components, etc.) can be handled by the material handling systems/devices, such as, conveyors (e.g., overload or surface mounted conveyor), material movement trolleys, vehicles, etc. The types of materials that are handled can be raw materials, semifinished, finished materials, etc. The materials are handled from one location (e.g., portion) of the industrial floor to another location (e.g., portion) on the industrial floor by the material handling systems.

In any industrial floor, there can be different types of computations needed while performing various activities on the machine shopfloor. In this case the machines can be considered as an edge computing device, so the machines can collaborate with each other to perform edge computing.

However, for different types of contextual situations (e.g., production of a material has increased, there is a decrease in production of a material, one portion of the industrial floor has inoperative material handling devices, etc.) the available machines or devices in the surrounding may not be enough to complete the edge computation(s) as per the need, so additional edge devices are required to complete the edge computing/computation(s).

Accordingly, discussed herein is a solution for such a scenario when additional edge devices are required to complete the edge computing/computation(s) (e.g., context aware edge computing). Before turning to the FIGS., an in-depth look at the novelties of said solution may be appreciated.

In some embodiments, based on the contextual need for/of the required edge computing in any portion of the industrial floor, the proposed solution may estimate/predict additional edge computing resources/devices (e.g., a smart device, a particular sensor, etc.) that are to be placed in a surrounding area of/associated with the portion of the industrial floor, and accordingly the material handling device (e.g., a conveyor, robotic trolley, etc.) will carry/transport the appropriate edge computing resources along with the materials which are to be carried towards the portion/location.

In some embodiments, the proposed solution may identify different physical portions/locations in the industrial floor where additional edge computing resources are required, and accordingly the material handling device may identify an appropriate material movement path while carrying the edge computing resources along with the materials that are to be moved.

In some embodiments, based on the need for additional edge computing resources in different portions/locations of the industrial floor, a robotic appendage of the material handling device at each location may offload the required edge computing resources along with the materials required in that location.

In some embodiments, the proposed solution may identify the material handling need in/at a different portion of industrial floor in/at a different timing, and may also identify the additional edge computing resources in the different portions of the industrial floor at the timing (e.g., particular time), and accordingly bring synergy in material movement and movement of additional edge computing resources.

In some embodiments, the proposed solution may predict how much/many edge computing resource(s) is/are required, and accordingly while transporting the material, the proposed solution may also keep a required number of edge computing resources on the material handling device.

In some embodiments, base on a change in edge computing needs in a different portion of the industrial floor, the proposed solution may arrange/rearrange/situate the edge computing resources inside the industrial floor while moving the material from one location to another location (e.g., situate the additional edge computing resources at a particular location to arrive at a portion of the industrial floor at a particular time). For example, the robotic appendage may move a material to the back of a conveyance line and replace its original location placement with an edge computing resource such that the edge computing resource reaches a particular portion of the industrial floor at a correct time. This may be beneficial if there is not a robotic appendage for placement of the edge computing resource at a portion that requires the resource.

Referring now to FIG. 1, illustrated is a block diagram of an example system 100 for dynamic placement of edge devices for context aware edge computing, in accordance with aspects of the present disclosure. As depicted, system 100 includes a physical environment 102 which can be split (e.g., physical or virtually) into portions 104A-D. In some embodiments, portion 104A includes edge computing resource 106A (e.g., a computer, a logistics device, a manufacturing device, etc.) and a material handing device 108 (e.g., the beginning of a conveyor, a trolley system, etc.). In some embodiments, portion 104B includes a placement device 112 (e.g., a robotic appendage/arm/etc.) and an edge computer resource 106B (e.g., an additional computing resource). In some embodiments, portion 104C includes an edge computing resource 106C and portion 104D may not include any edge computing resources.

As depicted, the system 100 may determine that portions 104A-C meet a requirement for edge computing resources, but portion 104D does not. The system 100 may analyze a path 110 of the material handling device 108 and utilize the placement device 112 to place/situate the edge computing resource 106B on the path 110 at a particular location 114 so that the edge computing resource 106B will reach the portion 104D at a particular time and satisfy an edge computing resource requirement for the portion 104D (e.g., such as when the particular time is when a predicted influx of material is being generated or within the portion 104D, etc.).

In some embodiments, the system 100 may utilizes sensor and/or cameras (not depicted) to analyze, determine, and/or predict a need of edge computing resources for each portion 104A-D. In some embodiments, the edge computing resource 106B may be a mobile device (e.g., specialized edge computing device) that is non-stationary and can be moved to whichever portion 104A-D requires additional edge computing resources. In some embodiments, the placement device 112 may move/rearrange a material already on the path 110 in order to place/situate the edge computing resource 106B.

Turning now to more capabilities of the system 100, in some embodiments, the system 100 may be implemented by extending traditional cloud centric edge computing architecture. The system 100 may keep identifying far edges and near edges (e.g., edge computing resources 106A-C) based on edge gateways network capabilities, such as: reachability, availability, upload/download capability, locality, and/or mobility. The system 100 may identify any near and/or far edges which are participating in edge computing capabilities. In some embodiments, the system 100 may identify a speed and/or direction of far edge devices, and may also identify how many far edge devices are available to participate in edge computing.

In some embodiments, in any industrial floor (e.g., physical environment 102), each and every machine and device will be identified uniquely, and will also be identified as having particular edge computing capabilities depending on the different machines/devices.

In some embodiments, the system 100 may identify a physical location of different edge computing devices, and aggregate edge computing capabilities in a portion 104A-D. The system 100 may identify the needs/requirements of edge computing processes for the industrial floor in different portions 104A-D. In some embodiments, the edge computing need can be evaluated using the security in the surrounding (e.g., cameras, motion sensors, etc.), complexity of the work (e.g., multistep processing, etc.), cleaning activity (e.g., a vat self-cleans after batch, etc.), etc.

In some embodiments, based on the identified edge computing need, the system 100 may identify how much of an edge computing resource/how many edge computing resources is/are required for the physical environment 102/for each portion 104A-D. In some embodiments, the system 100 may identify if existing machines can perform edge computation or if additional edge devices are required. In such an embodiment, the system 100 may have additional edge computing resources and for unit edge computing resources there will be a specified edge computing capability (e.g., automation, real-time analytics, virtual probes, etc.).

In some embodiments, based on the edge computing need in any portions 104A-D, the system 100 may identify if additional edge computing resources are required, and how many edge computing resources are required (e.g., if portion 104C is seeing an influx in material production, it may need the edge computing resources 106A and 106B in addition to edge computing resource 106C).

In some embodiments, the system 100 may identify various material movement modules (e.g., material handling devices) are present in the industrial floor, and may also identify the types of material movement modules (e.g., a trolley, a conveyor, etc.). In some embodiments, the system 100 may identify the types of material that are being handled from one location to another location in the industrial floor (e.g., portion 104A to portion 104B in the physical environment 102, etc.). In some embodiments, different types of material handling devices can move different types of material in different points of time from one location to another location. For example, in a multistep fabrication process at one point a conveyor may be used to transport one piece of material whereas after the material is heated, a crane may be used. In such an example, there may be multiple types of additional edge computing resources where each additional edge computing resource could be used in one of the specific locations.

In some embodiments, they system 100 may utilize historical learning and analyze the need for edge computation, and the system 100 may identify how/when additional edge computing resources are required and where to place the additional edge computing resources. In some embodiments, the material handling device 108 may identify when to move the material from one location to another location in the industrial floor.

In some embodiments, the system 100 may identify a synergy between the material movement (e.g., the path 110) and movement of the edge computing resources 106A-C in different locations/portions 104A-D (e.g., if the additional resource is already on the path 110 it may be rearranged to meet the need in a particular portion 104A-D, etc.). The material handling device 108 may identify the material movement location, additional edge resources in different portions 104A-D, and may carry both the material and edge computing resources 106A-C. In some embodiments, the material handling device 108 may identify an appropriate route (e.g., path 110) of material movement, and a robotic appendage (e.g., placement device 112) may take out required edge computing resources (e.g., 106B) along with the material as per the need.

Figure 2:
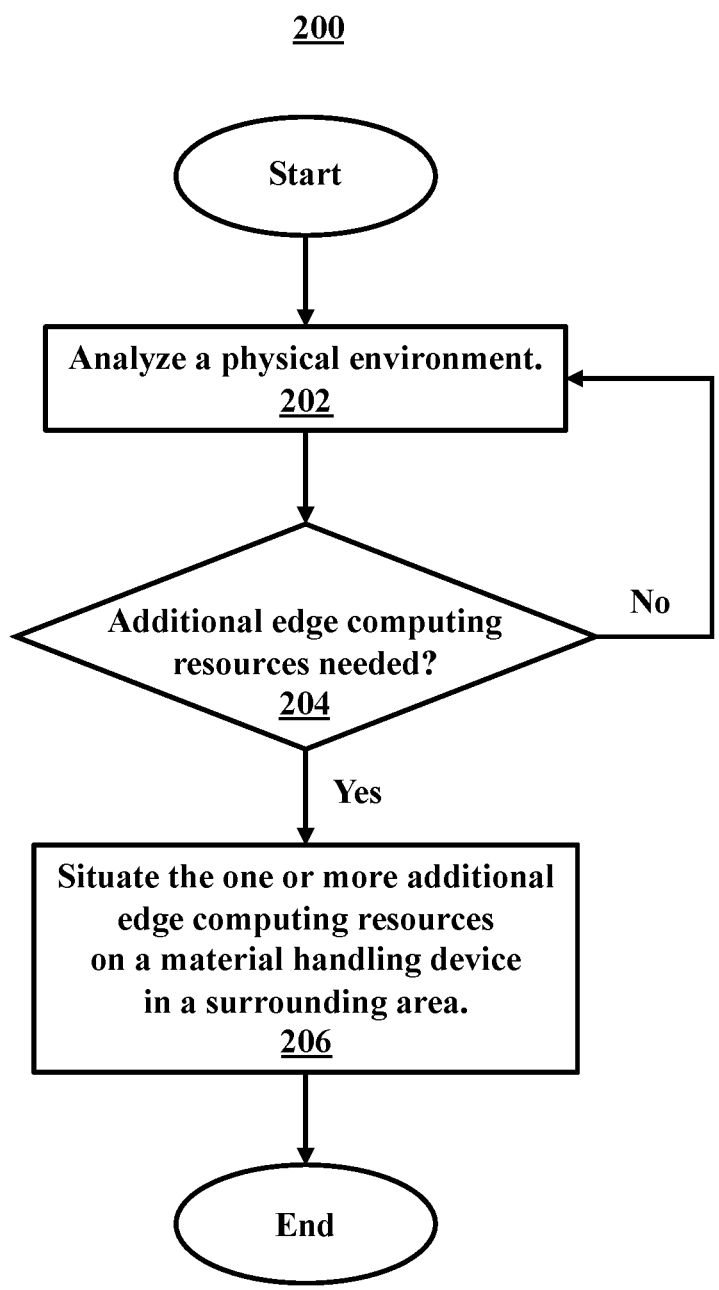
FIG. 2 illustrates a flowchart of an example method for context aware edge computing, in accordance with aspects of the present disclosure.

Referring now to FIG. 2, illustrated is a flowchart of an example method 200 for context aware edge computing, in accordance with aspects of the present disclosure. In some embodiments, the method 200 may be performed by a processor (e.g., of system 100 of FIG. 1, etc.).

In some embodiments, the method 200 begins at operation 202, where the processor analyzes a physical environment. In some embodiments, one or more portions of the physical environment may have an edge computing resource requirement (e.g., based on contextual/situational need). In some embodiments the edge computing resource requirement may be based on a determining/identifying that current edge computing resources in a portion are losing computing effectiveness/power/resiliency/etc.

In some embodiments, the method 200 may proceed to decision block 204, where the processor determines, based on the analyzing from operation 202, if one or more additional edge computing resources are to be placed in a surrounding area associated with the one or more portions of the physical environment.

If, at decision block 204, it is determined that no additional edge computing resources are needed, the method 200 may proceed back to operation 202 and continue to analyze the physical environment.

If, at decision block 204, it is determined that additional edge computing resources are needed, the method 200 may proceed to operation 206, where the processor automatically situates the one or more additional edge computing resources on a material handling device in the surrounding area and that is directed toward the one or more portions of the physical environment (e.g., situates a resource on a conveyor belt that is headed toward the portion needing additional resources). In some embodiments, after operation 206, the method 200 may end.

In some embodiments, discussed below, there are one or more operations of the method 200 not depicted for the sake of brevity and which are discussed throughout this disclosure. Accordingly, in some embodiments, situating the one or more additional edge computing resources on the material handling device may include the processor identifying a material movement path associated with the material handling device and dispersing the one or more additional edge computing resources along with material to be moved by the material handling device.

In some embodiments, the processor may automatically unload the one or more additional edge computing resources (and materials) at the one or more portions of the physical environment. In some embodiments, the processor may predict a particular time for when each of the one or more additional edge computing resources is required in each of the one or more portions of the physical environment (e.g., additional resources are needed in portion X in five minutes because production is switching to anther material, etc.). The processor may situate each of the one or more additional edge computing resources at a particular location on the material handling device in the surrounding area (e.g., in order to reach portion X in five minutes, place in portion U right now [five minutes before], etc.). In some embodiments, each of the one or more additional edge computing resources is situated at the particular location to arrive at each of the one or more portions of the physical environment at the particular time.

In some embodiments, the processor may maintain an amount of edge computing resources on the material handling device. The amount of edge computing resources may satisfy the edge computing resource requirement and the amount of edge computing resources on the material handling device may be maintained throughout transport of materials on the material handling device (e.g., edge computing resources may be constantly arranged/rearranged as needed to maintain the required amount).

In some embodiments, the processor may identify a change in the edge computing resource requirement and automatically rearrange the one or more additional edge computing resources on the material handling device (to go to different locations/portions). In some embodiments, rearranging the one or more additional edge computing resources on the material handling device may include the processor maintaining movement of materials on the material handling device from one portion of the physical environment to a second portion of the physical environment (e.g., there is a synergy between situating/placement of the additional edge computing resources and the materials already on the material handling device such that the movement of the materials is unimpeded and production flow/movement flow is not interrupted).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
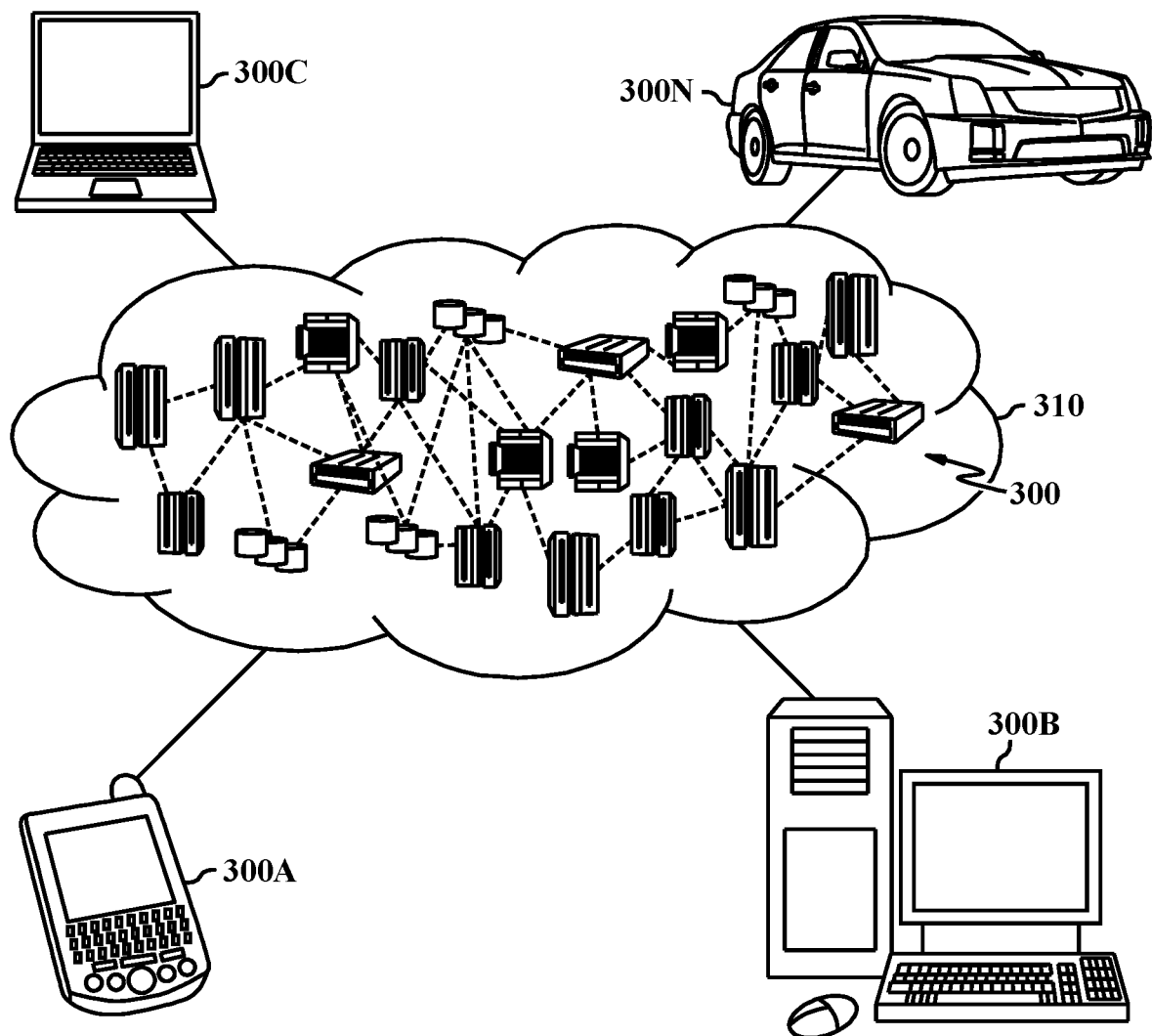
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
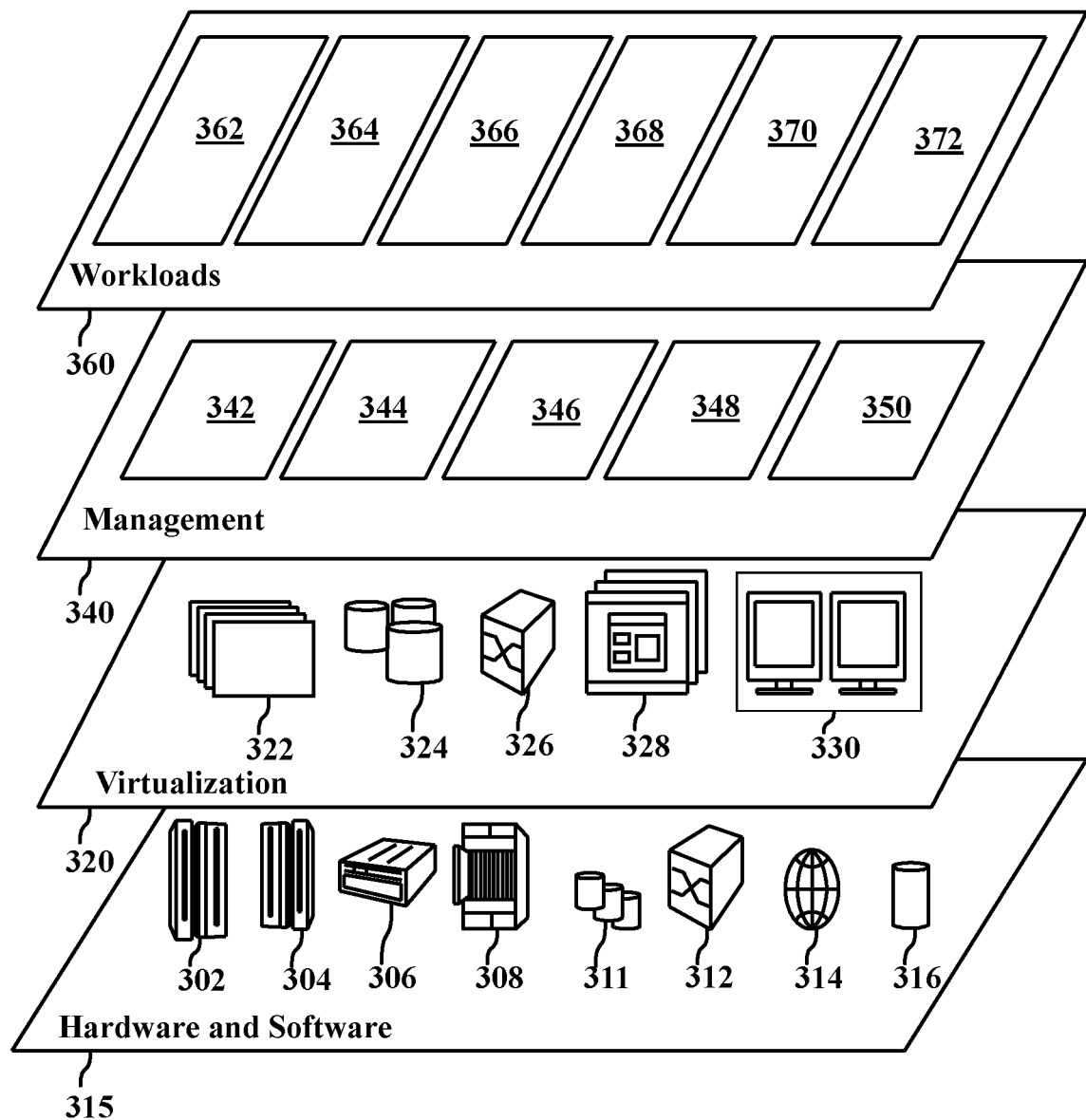
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and dynamic placement of edge devices for context aware edge computing 372.

Figure 4:
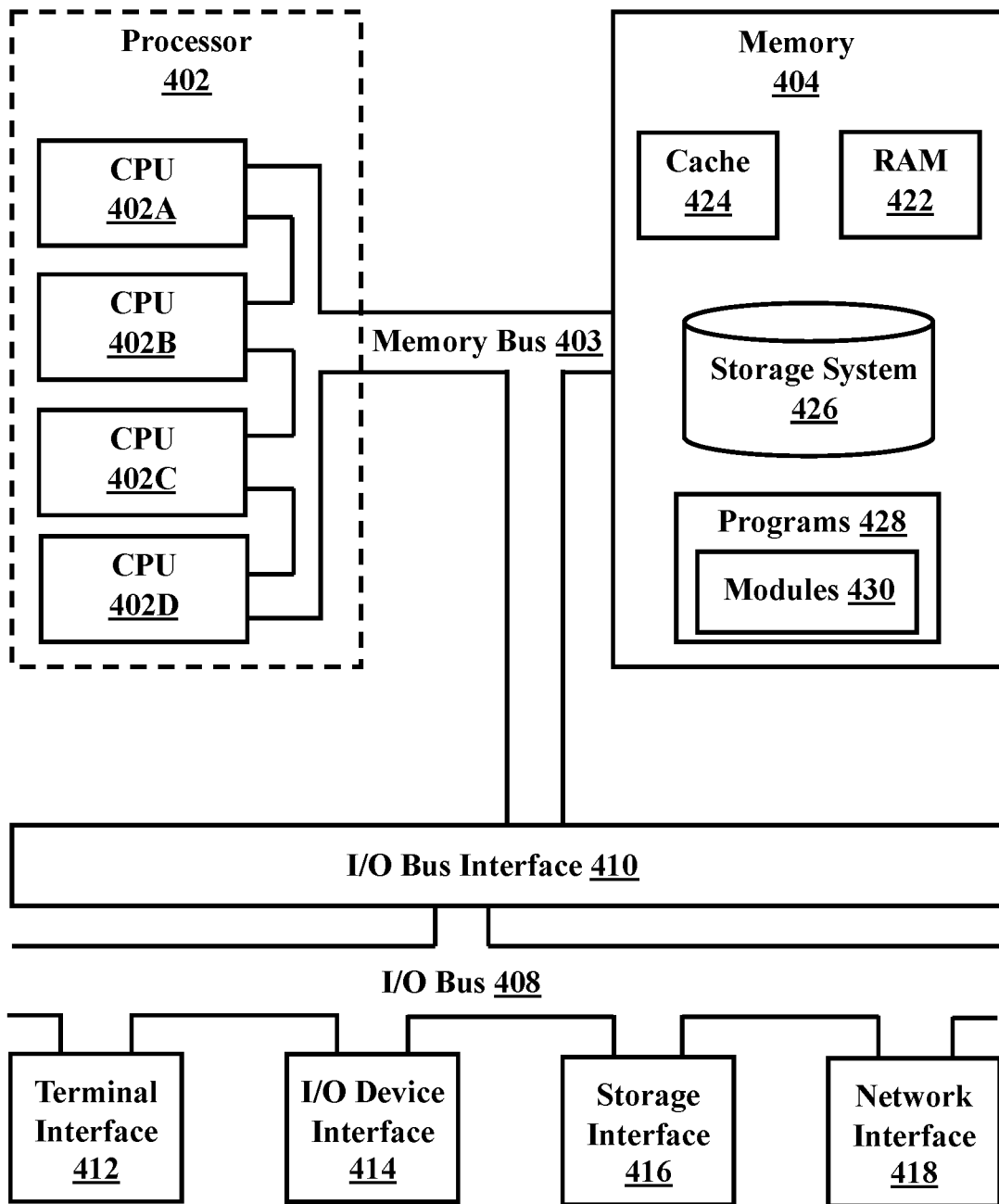
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for context aware edge computing, the system comprising:
   a memory; and
   a processor in communication with the memory, the processor being configured to perform operations comprising:
   analyzing a physical environment, wherein one or more portions of the physical environment have an edge computing resource requirement;
   determining, based on the analyzing, one or more additional edge computing resources to be placed in a surrounding area associated with the one or more portions of the physical environment; and
   situating, automatically by utilizing a robotic appendage, the one or more additional edge computing resources on a material handling device in the surrounding area and that is directed toward the one or more portions of the physical environment, wherein the material handling device is a conveyor.

2. The system of claim 1, wherein situating the one or more additional edge computing resources on the material handling device includes:
   identifying a material movement path associated with the material handling device; and
   dispersing the one or more additional edge computing resources along with material to be moved by the material handling device.

3. The system of claim 1, wherein the processor is further configured to perform operations comprising:
   unloading, automatically, the one or more additional edge computing resources at the one or more portions of the physical environment.

4. The system of claim 1, wherein the processor is further configured to perform operations comprising:
   predicting a particular time for when each of the one or more additional edge computing resources is required in each of the one or more portions of the physical environment; and
   situating each of the one or more additional edge computing resources at a particular location on the material handling device in the surrounding area, wherein the each of the one or more additional edge computing resources is situated at the particular location to arrive at each of the one or more portions of the physical environment at the particular time.

5. The system of claim 1, wherein the processor is further configured to perform operations comprising:
   maintaining an amount of edge computing resources on the material handling device, wherein the amount of edge computing resources satisfies the edge computing resource requirement, and wherein the amount of edge computing resources on the material handling device is maintained throughout transport of materials on the material handling device.

6. The system of claim 1, wherein the processor is further configured to perform operations comprising:
   identifying a change in the edge computing resource requirement; and
   rearranging, automatically, the one or more additional edge computing resources on the material handling device.

7. The system of claim 6, wherein rearranging the one or more additional edge computing resources on the material handling device includes:
   maintaining movement of materials on the material handling device from one portion of the physical environment to a second portion of the physical environment.

8. A computer-implemented method for context aware edge computing, the method comprising:
   analyzing, by a processor, a physical environment, wherein one or more portions of the physical environment have an edge computing resource requirement;
   determining, based on the analyzing, one or more additional edge computing resources to be placed in a surrounding area associated with the one or more portions of the physical environment; and
   situating, automatically by utilizing a robotic appendage, the one or more additional edge computing resources on a material handling device in the surrounding area and that is directed toward the one or more portions of the physical environment, wherein the material handling device is a conveyor.

9. The computer-implemented method of claim 8, wherein situating the one or more additional edge computing resources on the material handling device includes:
   identifying a material movement path associated with the material handling device; and
   dispersing the one or more additional edge computing resources along with material to be moved by the material handling device.

10. The computer-implemented method of claim 8, further comprising:
    unloading, automatically, the one or more additional edge computing resources at the one or more portions of the physical environment.

11. The computer-implemented method of claim 8, further comprising:
    predicting a particular time for when each of the one or more additional edge computing resources is required in each of the one or more portions of the physical environment; and
    situating each of the one or more additional edge computing resources at a particular location on the material handling device in the surrounding area, wherein the each of the one or more additional edge computing resources is situated at the particular location to arrive at each of the one or more portions of the physical environment at the particular time.

12. The computer-implemented method of claim 8, further comprising:
    maintaining an amount of edge computing resources on the material handling device, wherein the amount of edge computing resources satisfies the edge computing resource requirement, and wherein the amount of edge computing resources on the material handling device is maintained throughout transport of materials on the material handling device.

13. The computer-implemented method of claim 8, further comprising:
    identifying a change in the edge computing resource requirement; and
    rearranging, automatically, the one or more additional edge computing resources on the material handling device.

14. The computer-implemented method of claim 13, wherein rearranging the one or more additional edge computing resources on the material handling device includes:

maintaining movement of materials on the material handling device from one portion of the physical environment to a second portion of the physical environment.

15. A computer program product for context aware edge computing comprising a computer readable storage medium having program instructions embodied therewith, the program instructions executable by a processor to cause the processor to perform operations, the operations comprising:
analyzing a physical environment, wherein one or more portions of the physical environment have an edge computing resource requirement;
determining, based on the analyzing, one or more additional edge computing resources to be placed in a surrounding area associated with the one or more portions of the physical environment; and
situating, automatically by utilizing a robotic appendage, the one or more additional edge computing resources on a material handling device in the surrounding area and that is directed toward the one or more portions of the physical environment, wherein the material handling device is a conveyor.

16. The computer program product of claim 15, wherein situating the one or more additional edge computing resources on the material handling device includes:
identifying a material movement path associated with the material handling device; and
dispersing the one or more additional edge computing resources along with material to be moved by the material handling device.

17. The computer program product of claim 15, wherein the processor is further configured to perform operations comprising:
unloading, automatically, the one or more additional edge computing resources at the one or more portions of the physical environment.

18. The computer program product of claim 15, wherein the processor is further configured to perform operations comprising:
predicting a particular time for when each of the one or more additional edge computing resources is required in each of the one or more portions of the physical environment; and
situating each of the one or more additional edge computing resources at a particular location on the material handling device in the surrounding area, wherein the each of the one or more additional edge computing resources is situated at the particular location to arrive at each of the one or more portions of the physical environment at the particular time.

19. The computer program product of claim 15, wherein the processor is further configured to perform operations comprising:
maintaining an amount of edge computing resources on the material handling device, wherein the amount of edge computing resources satisfies the edge computing resource requirement, and wherein the amount of edge computing resources on the material handling device is maintained throughout transport of materials on the material handling device.

20. The computer program product of claim 15, wherein the processor is further configured to perform operations comprising:
identifying a change in the edge computing resource requirement; and
rearranging, automatically, the one or more additional edge computing resources on the material handling device, wherein rearranging the one or more additional edge computing resources on the material handling device includes:
maintaining movement of materials on the material handling device from one portion of the physical environment to a second portion of the physical environment.

* * * * *